Figure 5:
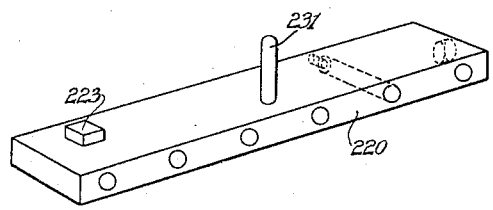

Oct. 7, 1924.
E. H. KINNARD
1,510,622
INDICATING AND REGISTERING DEVICE APPLICABLE TO POSTAL FRANKING MACHINES
Filed June 25, 1924    3 Sheets-Sheet 1
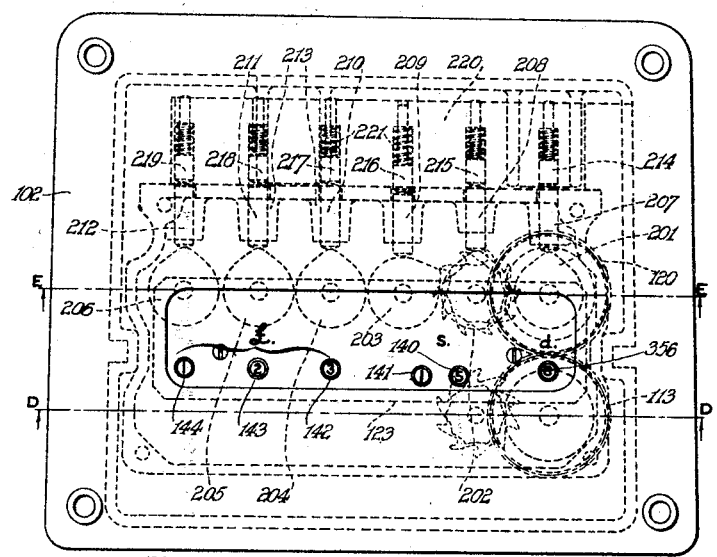
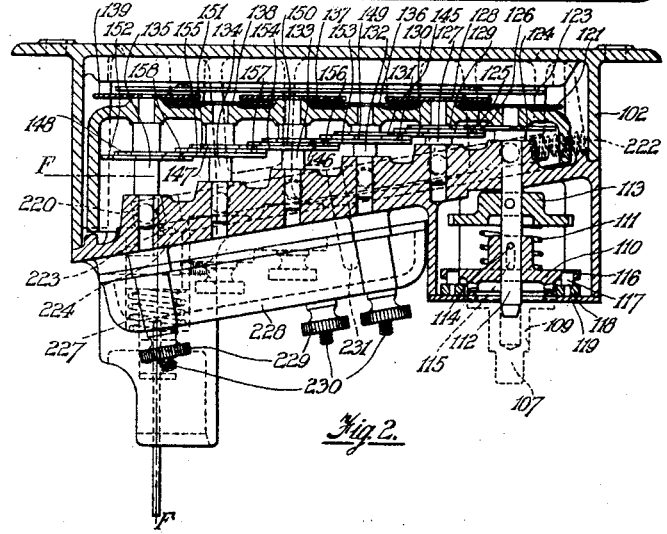
Inventor
Edward Henry Kinnard
By
B. Singer, Atty.

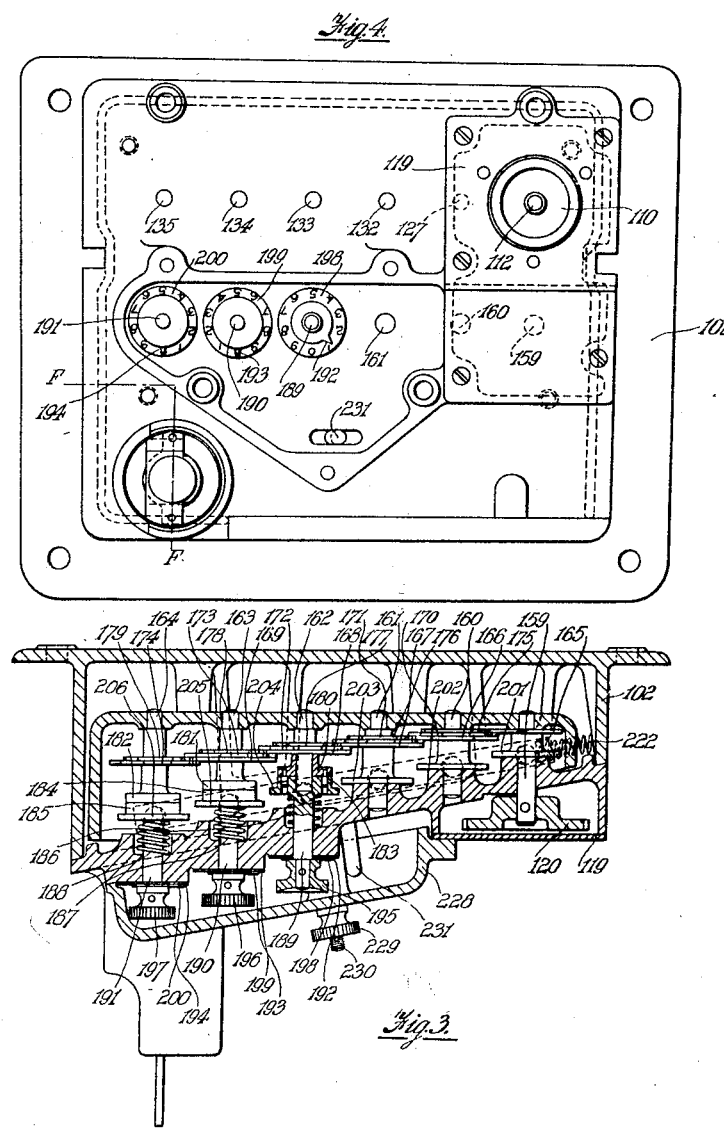

Oct. 7, 1924.　　　　　　　　　　　　　　　　1,510,622
E. H. KINNARD
INDICATING AND REGISTERING DEVICE APPLICABLE TO POSTAL FRANKING MACHINES
Filed June 25, 1924　　　3 Sheets-Sheet 3

Inventor
Edward Henry Kinnard
By
B. Singer, Atty.

Patented Oct. 7, 1924.

1,510,622

UNITED STATES PATENT OFFICE.

EDWARD HENRY KINNARD, OF LONDON, ENGLAND, ASSIGNOR TO UNIVERSAL POSTAL FRANKERS LIMITED, OF LONDON, ENGLAND, A BRITISH COMPANY.

INDICATING AND REGISTERING DEVICE APPLICABLE TO POSTAL-FRANKING MACHINES.

Application filed June 25, 1924. Serial No. 722,335.

*To all whom it may concern:*

Be it known that I, EDWARD HENRY KINNARD, a subject of the King of Great Britain, residing at Morning Post Building, 346 Strand, London, W. C. 2, England, have invented an Improved Indicating and Registering Device Applicable to Postal-Franking Machines, of which the following is a specification.

This invention relates to postal franking machines, and has for its object to provide an improved detachable meter therefor.

It has been proposed heretofore in a mail marking machine containing a single stamp impressing die to make the meter and stamp removable as a unit. With this arrangement the meter could be taken to the post office for setting by the postal authority without moving the machine; but when it was desired to change the value of the stamps impressed, a new meter unit having a stamp impressing die of the required value had to be substituted for that already in the machine.

According to the present invention a meter is provided which is detachable from the machine independently of the stamp drum or any other part of the machine, means being provided for locking the machine against operation when the meter is removed. The meter is intended for use with a postal franking machine of the kind in which any one of a number of stamp impressing dies can be brought selectively into operative position, and is adapted to be driven proportionately to the value of the stamps impressed through any usual or preferred mechanism which may form part of the postal franking machine. The meter is preferably so constructed that zeroizing of the indicating mechanism causes the machine to be rendered inoperative until the meter is reset to a prepaid amount, as is usual in machines of the kind referred to. The meter may also be arranged so that a member, which is actuated upon zeroizing of the meter to render the machine inoperative, also releases means for locking the machine whenever the meter is withdrawn.

The meter may comprise two groups of dials, one group being visible to the operator and indicating the total value of stamps impressed by the machine up to any given time whilst the other group after setting to a prepaid amount is enclosed by a sealed cover and is zeroized by operation of the machine.

Figure 6:
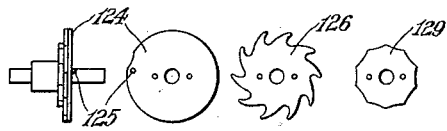
Figures 7, 8, 9:
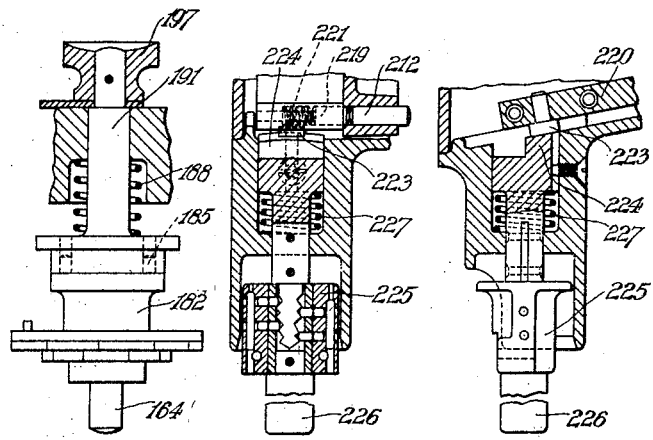

Reference will now be made to the accompanying drawings which illustrate by way of example a meter constructed according to the invention and in which:

Figure 1 is a front elevation,

Figure 2 is a sectional plan taken on the line D—D of Figure 1 looking in the direction of the arrows, Figure 3 is a sectional plan taken on the line E—E of Figure 1 looking in the direction of the arrows, Figure 4 is a rear elevation of the meter with the sealing cover removed, Figure 5 is a perspective view of the locking bar which is released for operation when the meter is zeroized, Figure 6 shows details of the various elements mounted on one of the meter spindles, Figure 7 is a detail view on an enlarged scale of one of the clutches by means of which the pointers of the zeroizing dials are secured to their spindles, Figure 8 is a sectional view taken on the line F—F of Figure 2, and Figure 9 is a sectional view taken at right angles to Figure 8.

The meter is contained in a casing 102 adapted to be secured in an opening formed in the casing of the machine with which it is to be used, the machine being so arranged that operation of its stamp impressing mechanism causes rotation of a shaft 107 forming a permanent part of the machine, the extent of such rotation or partial rotation of the shaft being proportional to the value of the stamp impressed. The outer end of the shaft 107 carries a ratchet clutch member 109 adapted when the meter is positioned for operation by the machine to engage a second ratchet clutch member 110 which is incorporate in and removable with the meter. When the meter is in operative position the members 109 and 110 are urged into positive engagement by a spring 111 (Figure 2) coiled round the hub of clutch member 110 which is mounted on a spindle 112 to which a spur wheel 113 is also fixed. The clutch member 110 is limited in its travel by a pin 114 carried by the spindle 112 and passing through a slot 115 in the bars of the said clutch member. The latter is also provided with holes 116 which, when the meter is withdrawn from the machine, register with pins 117 carried in a fixed ring 118 secured to the top cover plate 119 to prevent rotation of the spindle 112. The spur wheel 113 meshes with another wheel 120 which actuates a zeroizing train hereinafter described having the same diameter and number of teeth and which rotates with a pence dial 121, the two being coaxially mounted on spindle 112, one numeral only of the pence dial being visible at any time to the operator through a window 356 in a masking plate 122.

Mounted concentrically with the spur wheel 113 is a notched cam 124 (Figure 6) having a pin 125 projecting laterally therefrom. This pin engages once in a revolution with a ratchet toothed wheel 126 fast on a spindle 127 which also carries a dial plate 128 which indicates unit shillings, a notched disc 129 which engages the periphery of the notched cam 124, and cam 130 which has a pin 131 projecting laterally therefrom. The spindle 127 is in horizontal alignment with four other spindles 132, 133, 134 and 135 adapted to actuate respectively dial plates 136, 137, 138 and 139, which give indications respectively in tens of shillings, unit pounds, groups of £10.0.0. and groups of £100.0.0. The masking plate 123 is provided with further apertures 140, 141, 142, 143 and 144, the first two combining to give indications in shillings and 142, 143 and 144 allowing one numeral at a time on each of dials 137, 138 and 139 to be visible.

Spindles 132–135 are provided with notched discs 145, 146, 147 and 148, with ratchet wheels 149, 150, 151 and 152 whilst spindles 132, 133 and 134 carry respectively cams 153, 154 and 155 each provided with pins 156, 157 and 158. Each pin once in a revolution moves the toothed wheel on the next succeeding spindle through the space of one tooth, the spindles being normally held inoperative owing to the circular portions of the peripheries of cams 124, 130, 153, 154 and 155 engaging the partially circular notches in the discs 129, 145, 146, 147 and 148 movement of any spindle being possible only when the notch in the cam of the preceding spindle coincides with the peak between two notches of the disc with which it is in engagement.

The spur wheel 120 is mounted on a spindle 159 which with spindles 160, 161, 162, 163 and 164 carry the zeroizing train. The spindles are geared together in a manner similar to the totalizing mechanism above described, the spindles carrying notched cams 165, 166, 167, 168 and 169, ratchet wheels 170, 171, 172, 173 and 174 and notched discs 175, 176, 177, 178 and 179. Spindles 162, 163 and 164 (Figure 7) are formed at one end with clutch members 180, 181 and 182 adapted normally to engage corresponding clutch members 183, 184 and 185 under the influence of springs 186, 187 and 188, the clutch members 183–185 being carried in stub spindles 189, 190 and 191 which project through the wall of the casing and carry pointers 192, 193 and 194 and handles 195, 196 and 197 for manual adjustment. Preferably the clutch members 180–182 are formed with a circular ring of holes ten in number adapted to register with two pins formed on each of the clutch members 183–185 so that ten relative positions of each pair of clutch members can be obtained by withdrawing any one of the handles 195–197 against the action of springs 186–188 and imparting a partial rotation to the handles. The pointers 192–194 indicate above dial plates 198, 199 and 200 and are set by a postal authority to denote the total amount of stamps for which prepayment has been made for the machine to impress. During the operation of the machine the wheel 120 will rotate in the reverse direction to the wheel 113 and thus the pointers 192–194 will gradually approach their zero position as the totalizing mechanism approaches the total amount to which the pointers were originally set. The zeroizing train may also operate mechanism to render the machine inoperative when the pointer which indicated the maximum amount for which the meter had been set reaches its zero position. The machine may be rendered inoperative by mechanical locking devices or by electrical means which are actuated when the meter is zeroized by mechanism now to be described.

The spindles 159–164 carry cams 201, 202, 203, 204, 205 and 206 which engage the ends of plungers 207, 208, 209, 210, 211 and 212 slidably mounted in bosses 213 in the meter framework, these plungers engaging at their opposite ends with plungers 214, 215, 216, 217, 218 and 219 slidably mounted in sockets in a bar 220 (Figures 2 and 5) and normally urged by springs 221 into the sockets of plungers 207–212 to lock the bar 220 to the framework. The plungers 207–212 are slightly smaller in diameter than the sockets in which they slide so that when the peak of cam 201 has caused plunger 214 to be cleared from the socket the bar 220 can move slightly towards the left (Figure 2) under the influence of a spring 222 which engages its end. The plunger 214 is therefore moved slightly out of alignment with the socket and cannot re-enter the same until the meter is re-set. The action of cams 202–5 is similar to that of the cam 201 above described whilst the peak of cam 206 will not become operative in respect of plunger 219 until the machine has been utilized to impress stamps to the total value for which the meter was initially set. When this total is reached the pointers 192, 193 and 194 are all at their zero positions whilst the dials 137, 138 and 139 will indicate the total value of stamps impressed. When this position is reached the bar 220 will be completely freed and the spring 222 will move the bar sharply towards the left (Figure 2) removing a stop 223 carried at its end from engagement with a lug 224 (Figures 2, 8 and 9) formed on the end of a lock barrel 225 a stem 226 on the outer end of which engages the mechanism which caused the machine to be rendered inoperative when the meter is zeroized. When the stop 223 is removed from engagement with the lug 224 a spring 227 which is normally in a state of compression forces the lock barrel 225 and stem 226 inwardly towards the meter thereby releasing the locking mechanism and rendering the machine inoperative.

The inner face of the meter has a cover 228 which conceals the dials 198, 199 and 200, such cover being secured in place by nuts 229 threaded onto studs 230 secured in the main frame of the meter. The bar 220 also carries a pin 231 for manual operation also enclosed by the cover 228. The meter is secured into the casing of the machine by means of milled nuts.

The stem 226, may, for example, be arranged so as normally to close electrical contacts. It is to be understood that to adapt the meter above described to currencies other than sterling it is necessary only to alter the markings on the dials and the number of teeth on the wheels which operate them.

Before the machine can be operated the detachable meter is set to a prepaid amount by a postal authority, this being effected by moving the bar 220 manually to a position in which the spring 222 is compressed and in which the plungers 214-219 under the influence of their springs 221 engage in the sockets in the bosses 213. A key (which is kept in the possession of the postal authority) is inserted in the lock barrel 225 and enables when turned the lug 224 to be removed from the path of the stop 223 on the bar 220 which is thereby freed to be moved as above described, the lug 224 thereafter being engaged by the stop 223 to hold the stem 226 in its outermost position. The meter is set to the prepaid amount by pulling out any or all of the handles 195-197 to open the clutches 180—183, 181—184 and 182—185 so that by subsequent rotary movement of the handles the pointers 192-194 can be set to the desired positions, the springs 186-188 thereafter causing re-engagement of the clutches so that operation of the elements mounted on the spindles 159-164 will cause the pointers gradually to return to zero position.

I claim:—

1. In a postal franking machine a meter detachable from the machine independently of the stamp drum or any other part of the machine, means being provided for locking the machine against operation when the meter is removed and including a slidable locking member normally restrained by a number of devices adapted to be retracted successively by the operation of the meter.

2. In a postal franking machine a meter detachable from the machine independently of the stamp drum or any other part of the machine, means being provided for locking the machine against operation when the meter is removed and including a slidable locking member normally restrained by a number of devices adapted to be retracted successively by the operation of the meter, and a member to maintain the machine operative, and normally held in operative position by said slidable rocking bar and arranged to be removed from operative position so that the machine becomes locked against operation when the meter is zeroized or withdrawn from the machine.

In witness whereof I affix my signature.

EDWARD HENRY KINNARD.